United States Patent Office 3,766,089
Patented Oct. 16, 1973

3,766,089
RUTHENIUM CATALYST
Raul S. De Pablo, Painesville, and Howard N. Benedict, Mentor, Ohio, assignors to Diamond Shamrock Corporation, Cleveland, Ohio
No Drawing. Filed May 15, 1972, Ser. No. 253,471
Int. Cl. B01j 11/78
U.S. Cl. 252—412                                              9 Claims

ABSTRACT OF THE DISCLOSURE

An improved ruthenium catalyst is prepared by impregnating a catalyst support with a ruthenium chloride solution, drying the impregnated support by volatilization of the ruthenium chloride solution and then partially reducing the dried ruthenium chloride coating on the support. The catalyst is useful in the hydrogenation of the pyrroles. Spent catalyst can be rejuvenated by recoating with ruthenium chloride solution, drying the coated spent catalyst and then partially reducing the ruthenium chloride coating.

BACKGROUND OF THE INVENTION

(1) Field of the invention

This invention relates to an improved ruthenium catalyst, its preparation and use in the hydrogenation of pyrroles. The catalyst is prepared by impregnating a catalyst support with a ruthenium chloride solution, drying the impregnated support by volatilizing the ruthenium chloride solution and activating the dried impregnated support by partially reducing the dried ruthenium chloride coating on the support. Spent catalyst can be rejuvenated by recoating with ruthenium chloride solution, drying the coated spent catalyst by volatilization of the ruthenium chloride solution and then activating the dried recoated catalyst by partially reducing the ruthenium chloride coating.

(2) Description of the prior art

U.S. 3,161,605, Beck et al., issued Dec. 15, 1964, described preparation of a supported precious metal catalyst where the surface of the support is coated with a permeable layer of a precious metal such as ruthenium. This metal layer is obtained by impregnating the support with an aqueous solution of an ionizable ruthenium salt such as ruthenium chloride and reducing the undried support with hydrogen in a controlled humidity at a temperature below 100° C. These conditions permit reduction of the salt to take place at the same rate as the salt solution migrates from the support so that the metal forms an adherent coating on the surface of the support which cannot be sloughed off by abrasion. A final heating of the catalyst at a temperature above 100° C. and below the sintering temperature may be desirable in certain applications. The catalyst is used in the hydrogenation of organic compounds particularly in fume abatement units where nitrogen oxides are reacted with hydrogen, alkanes, olefins and other reducing gases.

SUMMARY OF THE INVENTION

This invention provides an improved ruthenium catalyst wherein the catalyst is obtained by impregnating a catalyst support with a solution of ruthenium chloride, drying the impregnated support by volatilization of the ruthenium chloride solution and then reducing the dried support in an atmosphere of hydrogen at 80° to 300° C. to obtain a partially reduced ruthenium chloride catalyst on the support.

DESCRIPTION OF THE PREFERRED EMBODIMENTS

The improved ruthenium catalyst can be prepared by impregnating a catalyst support with a ruthenium chloride solution. This solution can be prepared by dissolving ruthenium chloride in a solvent such as water or isopropanol. The ruthenium chloride can be in the form of a hydrate such as $RuCl_3 \cdot xH_2O$ where $x$ is 2.5 to 3.5 or any other suitable form. From about 0.08 to about 0.60 g. of ruthenium chloride can be dissolved in about 5 to about 20 ml. of a solvent and used to impregnate from about 1.4 to about 10 g. of alumina powder. The powder can be added to the ruthenium chloride solution and the resulting mixture agitated to form a slurry. The powder should be thoroughly mixed with solution to assure impregnation, i.e., the powder should be saturated with the solution. When the slurry is not sufficiently fluid, additional solvent can be added. If desired, another solvent such as methanol, acetone or other low boiling ruthenium chloride solvent may be substituted for isopropanol or water may be used alone. Use of an organic solvent may be preferred as it tends to produce finer particles having enhanced activity.

After the support is impregnated with ruthenium chloride solution, the impregnated support is dried by volatilizing the ruthenium chloride solution. If the impregnated support is in the form of a slurry, the slurry may be evaporated to dryness by volatilization of the ruthenium chloride solution. Evaporation can be accelerated by use of a slow stream of air. It is usually desirable to evaporate the slurry below the boiling point of the solution to avoid spattering. Likewise, the slurry can be dried in any suitable type of apparatus such as a rotating evaporator. If desired, the slurry can be filtered to obtain a wet filter cake which is then dried. The dry powder should be heated in air at about 90° to about 200° C. to remove the last traces of volatiles.

It is to be understood that the ruthenium chloride solution may also be applied to the powder by spraying or any suitable means which assures uniform distribution of the solution and gives results comparable to those obtained by the above impregnation procedure. If desired, a concentrated ruthenium chloride solution may be used. Likewise, the impregnated support may be dried by any suitable drying method.

After drying, the impregnated powder is treated with hydrogen to partially reduce the ruthenium chloride coating. This reduction can be carried out in a slow stream of hydrogen at about 80° to about 300° C. Satisfactory results can be obtained by reducing the impregnated powder in a slow stream of hydrogen at about 80° to about 250° C. for about 15 to about 60 minutes. After reduction, the impregnated powder is cooled to room temperature under hydrogen and is ready for use as a catalyst. The reduction can be carried out in any apparatus which is suitable for contacting the powder with hydrogen under these conditions.

The catalyst is useful in the reduction of organic compounds, particularly, pyrroles such as 2,5-dialkylpyrroles to cis-2,5-dialkylpyrrolidines. Use of the catalyst in the reduction of 2,5-dimethylpyrrole is shown in the examples below. After use in hydrogenation, the spent catalyst can be recovered from the reaction mixture by filtration, centrifugation, siphoning, decantation or any combination of these recovery methods. The spent catalyst is then washed in a suitable solvent such as acetone or methanol to remove most of the organic matter, dried in air at about 100° C., heated cautiously to 300° C. in an air stream to remove the remaining organic matter and then cooled to room temperature.

After this treatment, the spent catalyst can be rejuvenated by recoating with ruthenium chloride solution, drying the coated spent catalyst and then partially reducing the ruthenium chloride coating in the same manner as the original catalyst is prepared above. Spent catalyst may be rejuvenated more than once. Spent catalyst rejuvenated in this manner has activity comparable to that of the original catalyst. A further advantage of the rejuvenated catalyst is that it has a higher ruthenium content and higher recoveries of ruthenium can be effected than from the original catalyst. The spent catalyst should not be heated to temperatures above 500° to 600° C. as these temperatures destroy catalytic activity and the catalyst cannot be regenerated by recoating.

Any activated alumina powder having satisfactory properties for use as a catalyst support may be used in the preparation of this catalyst. A particularly useful commercial gamma alumina powder has the following properties:

Surface area (BET) [1] _____ 250 m.²/g.
Ultimate crystallite size (X-ray diffraction):
    020 reflection [2] _____ 37 angstroms.
    021 reflection [2] _____ 65 angstroms.
    440 reflection [1] _____ 45 angstroms.
Pore volume:
    0–100 angstroms [1] _____ 0.49 cc./gm.
    0–10,000 angstroms [1] _____ 0.53 cc./gm.
Mercury density (177 p.s.i.a.) [1] __ 1,205 gms./cc.
Helium density [1] _____ 3.32 gms./cc.
Loose bulk density [2] _____ 690 g./l. (43 lb./ft.³).
Particle size distribution [2] _____ 48% less than 45 microns and 11% greater than 90 microns.

[1] After calcination for 3 hours at 900° F.
[2] As is.

For a fuller understanding of the nature and objects of this invention, reference may be made to the following examples. These examples are given merely to illustrate the invention and are not to be construed in a limiting sense. All quantities, proportions and percentages given in these examples are by weight and all temperatures are at degrees C. unless otherwise indicated.

EXAMPLES 1–8

Preparation of fresh catalysts

Catalysts shown as Examples 1–8 in Table 1 are prepared using the indicated quantities of alumina, ruthenium chloride and solvents. The alumina is the commercial gamma alumina powder described above and the solvents are isopropanol and/or water. The ruthenium chloride used is $RuCl_3 \cdot xH_2O$ where $x$ is 2.5 to 3.5. A ruthenium chloride solution is prepared using the quantities of chloride and solvents shown for the particular example in Table 1 and is used to slurry the indicated quantity of alumina powder. The ruthenium chloride used in Examples 1–23 contains 38.0% ruthenium. After the slurry is thoroughly mixed, it is evaporated to dryness. The slurry is evaporated by heating at a temperature below the boiling point of the solution to avoid spattering and using a slow stream of air to accelerate evaporation. The dried powder is then heated in air at 150° to 200° C. for 20 to 25 minutes to remove the last traces of volatiles from the solution such as water or organic solvent, cooled to room temperature, and transferred to a hydrogenation apparatus where the ruthenium chloride coating on the powder is partially reduced at atmospheric pressure in a slow stream of hydrogen using the reduction temperature and the reduction time period shown for the particular example in Table 1. The powder is agitated continuously during the reduction and is cooled to room temperature in a slow stream of hydrogen after the reduction is complete. After cooling, the powder is ready for use as a catalyst, and contains the indicated percent ruthenium (wt. percent) in the form of the partially reduced ruthenium chloride.

Catalysts prepared in Examples 1–8 using the above procedure are evaluated in the hydrogenation of 2,5-dimethylpyrrole to cis-2,5-dimethylpyrrolidine. A total of 44 g. of freshly distilled 2,5-dimethylpyrrole is charged into a 250 ml. stirred stainless steel autoclave and 50 ml. of water together with the quantity of catalyst from the particular example shown in Table 2 are added. The autoclave is closed, purged several times with nitrogen to remove air and then pressure tested with nitrogen. If the pressure test is satisfactory, the autoclave is purged and charged with hydrogen to an initial pressure of 500 p.s.i.g. and heated to the temperature shown for the particular catalyst in Table 2. The hydrogenation mixture is agitated at 1200 r.p.m. and maintained at the above reaction conditions for the indicated time period. At the end of this period, the hydrogenation mixture is cooled to room temperature and the hydrogen vented. Then the hydrogenation mixture is removed from the autoclave and the catalyst separated from the mixture. The hydrogenation mixture is analyzed by vapor phase chromatography to determine the percent conversion to 2,5-dimethylpyrrolidine and the percent of cis-2,5-dimethylpyrrolidine present in the mixture of cis- and trans-isomers. The chromatograph contains a 3/16" x 6' column packed with 5% Amine 220 on Chromosorb "G" High Performance (80–100 mesh) and is operated under the following conditions. The column is used at a temperature of 70–90° C. for the quantitative analysis of cis- and trans-2,5-dimethylpyrrolidine and at a temperature of 150–160° C. for quantitative analysis of 2,5-dimethylpyrrole. The cis-isomer elutes first and is followed shortly by the trans-isomer after which the column temperature is immediately raised to 150–160° C. The pyrrole elutes about 3 minutes after the pyrrolidine isomers under these conditions. From the amount of pyrrole left, the percent of conversion is determined. Results of these analyses are shown in Table 2.

TABLE 1.—PREPARATION OF CATALYSTS

| Example number | Ruthenium chloride (g.) | Alumina (g.) | Solvent (ml.) | Reduction temp. (° C.) | Reduction time (min.) | Ruthenium (wt. percent) |
|---|---|---|---|---|---|---|
| 1 | 0.360 | 2.7 | Isopropanol (10) | 300 | 20 | 5.5 |
| 2 | 0.375 | 2.8 | Isopropanol (5) | 200–250 | 15 | 5.0 |
| 3 | 0.037 | 1.48 | Isopropanol (20) | 200–250 | 15 | 1.0 |
| 4 | 0.582 | 5.2 | Isopropanol (10) | 300 | 20 | 4.4 |
| 5 | 0.116 | 3.0 | Isopropanol (15) | 200–250 | 15 | 1.8 |
| 6 | 0.158 | 6.0 | Isopropanol (10) plus water (3) | 80 | 60 | 1.0 |
| 7 | 0.137 | 6.0 | Water (10) | 200 | 20 | 1.0 |
| 8 | 0.080 | 10.0 | Isopropanol (15) plus water (5) | 140 | 60 | 0.3 |

TABLE 2.—HYDROGENATION OF 44 G. OF FRESHLY DISTILLED DIMETHYLPYRROLE IN 50 ML. WATER

| Example number | Ruthenium (wt. percent) | Catalyst (wt. percent) | Reaction conditions | | | Dimethyl pyrrolidine | |
|---|---|---|---|---|---|---|---|
| | | | Temp. (° C.) | Press. (p.s.i.g.) | Time (hrs.) | Percent conversion | Percent cis-isomer |
| 1 | 5.5 | 1 | 130 | 500 | 5 | 98 | 93 |
| 2 | 5.0 | 1 | 135 | 500 | 4.5 | 98 | 93 |
| 3 | 1.0 | 3 | 130 | 500 | 2.5 | 87 | 93 |
| 4 | 4.4 | 1 | 130 | 500 | 2.5 | 80 | 92 |
| 5 | 1.8 | 2 | 130 | 500 | 3.75 | 98 | 92 |
| 6 | 1.0 | 3 | 130 | 500 | 5 | 98 | 96 |
| 7 | 1.0 | 3 | 130 | 500 | 5 | 92 | 96 |
| 8 | 0.3 | 9 | 130 | 500 | 5 | 84 | 96 |

EXAMPLES 9–21

Preparation of catalysts from spent catalysts

The following procedure is used to rejuvenate or re-activate spent catalyst from 2,5-dimethylpyrrole hydrogenations. In Examples 9–14, the spent catalyst has low activity, i.e., the catalyst converts about 10% to about 13% of the pyrrole to pyrrolidine. Catalysts shown as Examples 9–21 in Table 3 are prepared using the indicated quantities of spent catalyst from previous hydrogenations, ruthenium chloride and solvents. Before use, the spent catalyst is washed with acetone to remove any organic matter, dried in air at about 100° C., then heated cautiously to about 300° C. in an air stream to remove any remaining traces of organic matter and then cooled to room temperature.

After this treatment, the spent catalyst is recoated by slurrying in a ruthenium chloride solution prepared in the same manner as in Examples 1–8 but using the quantities of spent catalyst, ruthenium chloride and solvents to form ruthenium chloride solutions. Details are given for the particular example in Table 3. The slurry is then evaporated by heating at a temperature below the boiling point of the solution and using a slow stream of dry air to accelerate evaporation. After evaporation of the solvent, the dried powder is then heated in air at 150° to 200° C. for 20 to 35 minutes to remove the last traces of solvent, cooled to room temperature and transferred to a hydrogenation apparatus where the ruthenium coating on the spent catalyst is activated by partially reducing the ruthenium chloride in a slow stream of hydrogen at atmospheric pressure using the reduction temperature and the reduction period shown for the particular example in Table 3. The catalyst is agitated continuously during the reduction and is cooled to room temperature in a slow stream of hydrogen after the reduction is complete. The cooled catalyst is ready for use.

Activity of each of these catalysts prepared from the recoated spent catalysts is determined following the general procedure described in Examples 1–8 and the following conditions: 44 g. 2,5-dimethylpyrrole, 50 ml. water, reaction temperature of 130°±2° C., initial hydrogen pressure of 500 p.s.i.g., 3% catalyst based on the weight of pyrrole and reaction time of 5 hrs. Results of these evaluations are shown in Table 4. These data include the percent conversion to 2,5-dimethylpyrrolidine present in the hydrogenation mixtures of cis- and trans-isomers as determined by vapor phase chromatography using the procedure described in Examples 1–8.

TABLE 3.—PREPARATION OF CATALYSTS FROM SPENT CATALYSTS

| Example number | Ruthenium chloride (g.) | Spent catalyst (g.) | Solvent (ml.) | No. of recoatings | Reduction temp. (° C.) | Reduction time (min.) |
|---|---|---|---|---|---|---|
| 9 | 0.138 | 6.0 | Water (15) | 1 | 250 | 10 |
| 10 | 0.162 | 6.2 | Water (20) | 1 | 250 | 20 |
| 11 | 0.130 | 5.0 | do | 1 | 250 | 60 |
| 12 | 0.141 | 6.0 | Water (10) | 1 | 200 | 20 |
| 13 | 0.118 | 4.6 | Water (15) | 1 | 110 | 25 |
| 14 | 0.135 | 5.0 | Isopropanol (15) | 1 | 100 | 60 |
| 15 | 0.038 | 1.4 | Water (10) | 2 | 200 | 20 |
| 16 | 0.030 | 1.3 | do | 3 | 150 | 25 |
| 17 | 0.034 | 1.4 | do | 2 | 200 | 20 |
| 18 | 0.033 | 1.3 | Water (15) | 2 | 200 | 20 |
| 19 | 0.030 | 1.0 | do | 1 | 100 | 60 |
| 20 | 0.024 | 0.88 | Isopropanol (5) | 4 | 200 | 20 |
| 21 | 0.019 | 0.70 | do | 2 | 100 | 60 |

TABLE 4.—EVALUATION OF CATALYSTS PREPARED IN EXAMPLES 9–21 FROM SPENT CATALYSTS

| Example number | Dimethylpyrrolidine | | Remarks |
|---|---|---|---|
| | Percent conversion | Percent cis-isomer | |
| 9 | 81 | 91 | Ca. 10% conversion before recoating. |
| 10 | 100 | 79 | Do. |
| 11 | 99 | 90 | Do. |
| 12 | 98 | 92 | Do. |
| 13 | 92 | 95 | Do. |
| 14 | 97 | 95 | Do. |
| 15 | 85 | 94 | Spent catalyst from Example 13. |
| 16 | 78 | 95 | Spent catalyst from Example 15. |
| 17 | 94 | 98 | Spent catalyst from Example 9. |
| 18 | 84 | 97 | Spent catalyst from Example 10. |
| 19 | 85 | 99 | Spent catalyst from Example 6. |
| 20 | 72 | 97 | Spent catalyst from Example 16. |
| 21 | 94 | 94 | Spent catalyst from Example 19. |

Table 5 shows preparation conditions, chlorine content, ruthenium content, and activity of selected catalysts from the foregoing examples plus two new examples, Examples 22 and 23 which are outside the scope of this invention. Examples 22 and 23 are prepared by the above methods with the exception that the reaction temperature is above 250° C., i.e., at 450° C. and 400° C., respectively. The chlorine and ruthenium contents in the catalysts are determined quantitatively by X-ray fluorescence techniques. Examination of the catalysts by X-ray diffraction does not show any evidence of crystallinity.

It is to be understood that although the invention has been described with specific reference to particular embodiments thereof, it is not to be so limited, since changes and alterations therein may be made which are within the full intended scope of this invention as defined by the appended claims.

TABLE 5.—COMPARISON OF CATALYTIC ACTIVITY

| Ex. No. | Reaction temp. (° C.) | Reaction time (min.) | Percent chlorine | Percent ruthenium | Catalytic activity |
|---|---|---|---|---|---|
| 22 | 450 | 420 | 0.3 | 0.9 | Poor.[1] |
| 23 | 400 | 30 | 0.6 | 1.0 | Do.[2] |
| 10 | 250 | 20 | 0.93 | 1.0 | Very good.[3] |
| 11 | 250 | 60 | 0.86 | 1.0 | Do.[3] |
| 12 | 200 | 20 | 0.94 | 0.97 | Do.[3] |
| 13 | 100 | 25 | 1.0 | 0.98 | Do.[3] |
| 8 | 140 | 60 | 0.29 | 0.3 | Good.[4] |

[1] Fresh catalyst prepared from 15 g. alumina, 0.247 ruthenium chloride and 20 ml. water gives ca. 40-50% conversion (estimate).
[2] Fresh catalyst prepared from 16 g. alumina, 0.335 g. ruthenium chloride and 15 ml. isopropanol gives less than 20% conversion.
[3] Catalyst recoated once.
[4] Fresh catalyst.

What is claimed is:

1. A method for preparing a catalyst which comprises
   (a) impregnating a catalyst support with a solution of ruthenium chloride to coat the support, then
   (b) drying the impregnated support by volatilizing the ruthenium chloride solution to obtain a dry coating of ruthenium chloride on the support, thereafter
   (c) reducing the dry coating of ruthenium chloride on the support in an atmosphere of hydrogen at about 80° to about 300° C. to obtain a partially reduced ruthenium chloride coating on the support, and then
   (d) cooling the partially reduced ruthenium chloride coated support to obtain the catalyst.

2. The method of claim 1 wherein the ruthenium chloride solution contains a low boiling solvent, selected from the group consisting of water, alcohols and ketones.

3. The method of claim 1 wherein the catalyst support is gamma alumina powder.

4. The catalyst produced by the method of claim 1.

5. A method for rejuvenating a spent ruthenium catalyst which comprises
   (a) impregnating the spent catalyst with a solution of ruthenium chloride to coat the spent catalyst, then
   (b) drying the impregnated spent catalyst by volatilizing the ruthenium chloride solution to obtain a dry coating of ruthenium chloride on the spent catalyst, thereafter
   (c) reducing the dry coating of ruthenium chloride on the spent catalyst in an atmosphere of hydrogen at about 80° to about 300° C. to obtain a partially reduced ruthenium chloride coating on the spent catalyst, and then
   (d) cooling the partially reduced ruthenium chloride coated spent catalyst to obtain the rejuvenated catalyst.

6. The method of claim 5 wherein the ruthenium chloride solution contains a low boiling solvent selected from the group consisting of water, alcohols and ketones.

7. The rejuvenated catalyst produced by the method of claim 5.

8. The method of claim 5 wherein the spent catalyst is a spent rejuvenated ruthenium catalyst.

9. The rejuvenated catalyst produced by the method of claim 8.

References Cited
UNITED STATES PATENTS

| 3,081,357 | 3/1963 | Alderson et al. | 252—441 X |
| 3,161,605 | 12/1964 | Beck et al. | 252—466 PT X |
| 3,524,899 | 8/1970 | Candlin et al. | 252—441 X |

PATRICK P. GARVIN, Primary Examiner

U.S. Cl. X.R.

252—441; 260—326.8